United States Patent
Ito (10) Patent No.: US 11,004,214 B2
(45) Date of Patent: May 11, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kan Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 178 days.

(21) Appl. No.: 16/020,778

(22) Filed: Jun. 27, 2018

(65) Prior Publication Data

US 2019/0012793 A1    Jan. 10, 2019

(30) Foreign Application Priority Data

Jul. 4, 2017    (JP) .............................. JP2017-131003

(51) Int. Cl.
     *G06T 7/246*      (2017.01)
     *G06T 7/194*      (2017.01)
     (Continued)

(52) U.S. Cl.
CPC .......... *G06T 7/248* (2017.01); *G06F 21/6254* (2013.01); *G06K 9/00369* (2013.01); *G06T 7/11* (2017.01); *G06T 7/174* (2017.01); *G06T 7/194* (2017.01); *G06T 7/254* (2017.01); *G08B 13/19656* (2013.01); *G08B 13/19686* (2013.01); *G08B 25/08* (2013.01);
(Continued)

(58) Field of Classification Search
CPC ......... G06T 7/248; G06T 7/174; G06T 7/254; G06T 7/11; G06T 7/194; G06T 2207/30232; G06T 2207/30242; G06T 11/60; G06T 2207/30196; G06T 7/246; G08B 13/19686; G08B 13/19656; G08B 25/08; G06F 21/6254; G06K 9/00362; G06K 9/00369; G06K 2209/21; H04N 7/18

See application file for complete search history.

(56) References Cited

U.S. PATENT DOCUMENTS 10,467,479 B2 * 11/2019 Kawano ............. G06K 9/00771
2003/0231787 A1 * 12/2003 Sumi ................ G08B 13/19686
                                                  382/103

(Continued)

FOREIGN PATENT DOCUMENTS

CN      101996410 A      3/2011
CN      102540264 A      7/2012

(Continued)

*Primary Examiner* — Kim Y Vu
*Assistant Examiner* — Molly Delaney
(74) *Attorney, Agent, or Firm* — Canon U.S.A., Inc. IP Division (57) ABSTRACT

Anonymization processing for protecting privacy and personal information can be appropriately performed based on a detection state of a moving object within an imaging range. Processing corresponding to one of a first mode for anonymizing an area of a human body based on a fixed background image and a second mode for anonymizing the area of the human body based on a basic background image is performed on an area of a detected moving object based on a detection result of a moving object detection unit.

17 Claims, 5 Drawing Sheets

(51) Int. Cl.
*G06T 7/174* (2017.01)
*G06T 7/254* (2017.01)
*G06K 9/00* (2006.01)
*G06T 11/60* (2006.01)
*G08B 13/196* (2006.01)
*G06T 7/11* (2017.01)
*G08B 25/08* (2006.01)
*G06F 21/62* (2013.01)

(52) U.S. Cl.
CPC .......... *G06K 2209/21* (2013.01); *G06T 11/60* (2013.01); *G06T 2207/30196* (2013.01); *G06T 2207/30232* (2013.01); *G06T 2207/30242* (2013.01)

(56) References Cited

U.S. PATENT DOCUMENTS

| | | | |
|---|---|---|---|
| 2005/0180595 A1* | 8/2005 | Horii | G06K 9/00664 382/100 |
| 2009/0179994 A1* | 7/2009 | Miyazaki | H04N 5/23261 348/208.4 |
| 2010/0271494 A1* | 10/2010 | Miyasako | G06K 9/00261 348/208.1 |
| 2016/0171332 A1* | 6/2016 | Kawano | G06T 7/215 382/173 |
| 2018/0033151 A1* | 2/2018 | Matsumoto | G06F 21/84 |
| 2018/0359449 A1* | 12/2018 | Matsumoto | H04N 7/181 |

FOREIGN PATENT DOCUMENTS

| | | |
|---|---|---|
| CN | 104156942 A | 11/2014 |
| CN | 104809742 A | 7/2015 |
| CN | 106650638 A | 5/2017 |
| EP | 2555162 A1 | 2/2013 |
| JP | 2008-191884 A | 8/2008 |
| JP | 2016-115214 A | 6/2016 |
| JP | 2017-098879 A | 6/2017 |

* cited by examiner

FIG.4B

IMAGE PROCESSING APPARATUS, IMAGE PROCESSING METHOD, AND STORAGE MEDIUM

BACKGROUND

Field

The present invention relates to a technique for protecting privacy by image processing on an image captured by a monitoring camera or the like.

Description of the Related Art

With the increasing number of monitoring cameras recently installed in various places, the importance of privacy protection for individuals in images captured by monitoring cameras and protection of personal information about the individuals has been increasing.

For example, Japanese Patent Application Laid-Open No. 2008-191884 discuses a technique for extracting a human body area in an image by using a background image and performing blurring processing on the extracted human body area.

Japanese Patent Application Laid-Open No. 2016-115214 discuses a technique in which a plurality of detectors (a moving object detection unit and a human body detection unit) is used to update a stable background image including no foreground object by tracking variations in background, thereby enabling detection of a protection area with a higher accuracy and increasing the accuracy for privacy protection.

However, in the case of the techniques described above, for example, if a large number of people exist in an imaging range of a monitoring camera and the area of the imaging range is so crowded with people that the people hardly move and stay in the area, it is difficult to detect a human body and it is also difficult to detect a human body as a moving object. In such an imaging environment, for example, if update processing is performed on the stable background image by tracking variations in background, a human body, which is a subject, is gradually detected as a background. In other words, if a human body is detected as a background, the privacy protection processing for applying concealment processing (mask processing or the like) to the area of the human body does not function normally, so that the human body (human figure) is displayed in a visually recognizable state.

SUMMARY

According to an aspect of the present invention, an image processing apparatus includes an image capturing unit configured to acquire a captured image, a holding unit configured to hold a first background image, a moving object detection unit configured to detect a moving object in the captured image, an updating unit configured to generate a second background image based on the first background image and a detection result of the moving object detection unit, and an anonymization unit configured to perform, based on the detection result of the moving object detection unit, processing on an area of the moving object detected by the moving object detection unit, the processing corresponding to one of a first mode for anonymizing the area of the moving object based on the first background image and a second mode for anonymizing the area of the moving object based on the second background image.

Further features of the present invention will become apparent from the following description of exemplary embodiments with reference to the attached drawings.

DESCRIPTION OF THE EMBODIMENTS

Embodiments of the present invention will be described in detail below with reference to the accompanying drawings.

An image processing apparatus according to an embodiment of the present invention is, for example, an apparatus that creates an image in which the privacy of a protection target is protected from a video image captured by a monitoring camera.

Figure 1:
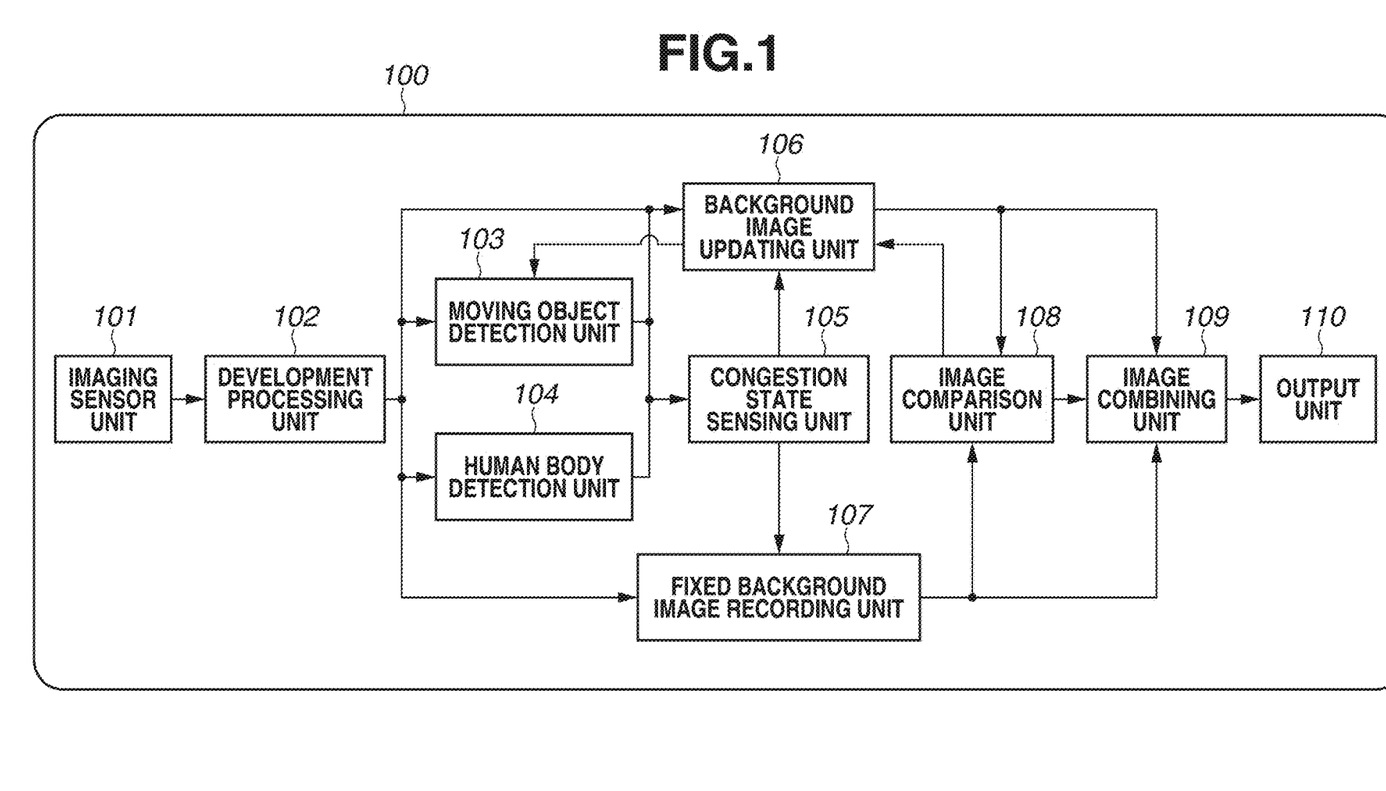
FIG. 1 is a block diagram illustrating a schematic configuration example of an image processing apparatus.

FIG. 1 is a block diagram illustrating a schematic configuration example of an image processing apparatus 100 according to an embodiment of the present invention. The image processing apparatus 100 according to the present embodiment includes an imaging sensor unit 101, a development processing unit 102, a moving object detection unit 103, a human body detection unit 104, a congestion state sensing unit 105, a background image updating unit 106, a fixed background image recording unit 107, an image comparison unit 108, an image combining unit 109, and an output unit 110. The configuration of the image processing apparatus 100 according to the present embodiment is not limited to the configuration illustrated in FIG. 1.

The imaging sensor unit 101 includes an image sensor, such as a complementary metal-oxide semiconductor (CMOS) sensor that converts an optical image formed on an imaging plane through an optical system, which is not illustrated, into an electrical signal by photoelectric conversion, and an analog-to-digital (A/D) converter that converts the electrical signal into a digital signal. While FIG. 1 illustrates a configuration example including a camera (imaging sensor unit 101) that captures a video image, the camera may be an external camera. The camera used to capture a video image is not limited to a monitoring camera, but instead may be a digital camera, various information terminals including a camera function, such as a smartphone, a tablet terminal, and a personal computer, an industrial camera, an in-vehicle camera, or the like.

The development processing unit 102 performs predetermined pixel interpolation or color conversion processing on the digital signal output from the imaging sensor unit 101, and generates digital video image data of, for example, R (red), G (green), B (blue), or Y (brightness), and UV (color difference). Further, the development processing unit 102 performs predetermined arithmetic processing using the digital video image data subjected to development processing, and performs image processing such as white balance, sharpness, contrast, and color conversion based on the obtained arithmetic processing result. Captured image data on which the image processing has been performed by the development processing unit 102 is sent, as input image data, to the moving object detection unit 103, the human body detection unit 104, the background image updating unit 106, and the like.

The moving object detection unit 103 performs processing for detecting a moving subject (moving object) by using the input image obtained from the development processing unit 102. The moving object detection unit 103 according to the present embodiment recognizes a moving foreground object based on a temporal change of the subject or the like in the input image and detects the recognized foreground object as a moving object. As a method for detecting a moving object, for example, a background difference method for creating a background model in advance and comparing the background model with an input image to detect a moving object can be used. The background model is generated by, for example, the background image updating unit 106, which is described below, and is updated as needed by following a change in the state within the image or a moving object detection result (a scene or area in which no moving object is detected is added as a background image). Further, the moving object detection unit 103 generates moving object information including central coordinates of a moving object in the input image and shape information about the moving object every time processing is performed on the image, and outputs the generated moving object information to each of the congestion state sensing unit 105 and the background image updating unit 106.

The human body detection unit 104 performs processing for detecting a subject (human body) of a human figure by using the input image obtained from the development processing unit 102, and also performs processing for tracking the detected human body. The human body detection unit 104 according to the present embodiment recognizes a foreground object having features of the human body based on features of the input image, and detects the recognized foreground object as the human body. As a method for detecting a human body, for example, processing in which central coordinates of a human body included in an image and circumscribed rectangle coordinates are detected by pattern matching processing can be used. The human body detection unit 104 generates human body information including the coordinates of the circumscribed rectangle of a human body area in the input image every time processing is performed on the image, and outputs the generated human body information to each of the congestion state sensing unit 105 and the background image updating unit 106. The human body area may be indicated by, for example, coordinates for specifying an area surrounded by a curve along the shape of the human figure. Alternatively, the human body area may be an area including both the face and the body of the human figure, or an area including only the face of the human figure. The human body may be the entire body of the human figure, the upper body (torso) including both arms of the human figure, or a part of the body of the human figure. When the human body is detected by pattern matching, an image of a detection target is scanned to extract a matched area by using the features corresponding to the parts of the detection target, respectively, as a dictionary.

The congestion state sensing unit 105 senses a congestion state of a subject based on the moving object information output from the moving object detection unit 103, or the human body information output from the human body detection unit 104, and outputs information indicating the congestion state to each of the background image updating unit 106 and the fixed background image recording unit 107. Congestion state sensing processing performed by the congestion state sensing unit 105 will be described in detail below.

The image processing apparatus 100 according to the present embodiment performs an operation in a first mode when a congestion state where a target area is crowded with human bodies as subjects is sensed in the congestion state sensing unit 105, and performs an operation in a second mode when a non-congestion state where the target area is not crowded with human bodies is sensed. The operations in the first mode and the second mode will be described in detail below.

The background image updating unit 106 creates and holds a background image including no protection target based on the input image from the development processing unit 102, and at least one of the moving object information from the moving object detection unit 103, and the human body information from the human body detection unit 104, and protection target information from the image comparison unit 108. The protection target used herein refers to a target whose privacy or personal information should be protected. In the present embodiment, the protection target is an image area of a human body which is a subject included in the input image. Although a human body (human figure) is set as the protection target in the present embodiment, the protection target may be an object or the like other than a human body. In a case where the non-congestion state where the target area is not crowded with human bodies is sensed by the congestion state sensing unit 105, the background image updating unit 106 updates the background image as an operation included in the second mode, holds the background image, and outputs the background image to each of the image comparison unit 108 and the image combining unit 109. A background image that includes no protection target and is created and updated by the background image updating unit 106 is hereinafter referred to as a basic background image. Processing for updating the basic background image in the background image updating unit 106 will be described in detail below. The background image updating unit 106 according to the present embodiment generates a background model used during the moving object detection processing in the moving object detection unit 103 described above, and preliminarily generates a background image to be recorded on the fixed background image recording unit 107.

The fixed background image recording unit 107 records (holds) an image in which no subject (human body) exists (no human body is included) as a protection target, as a background image including no protection target. The background image to be recorded on the fixed background image recording unit 107 is a captured image obtained after an image of a monitoring target area, which does not include any human body and other foreground objects as protection targets, is preliminarily captured by the imaging sensor unit 101 and development is performed on the image by the development processing unit 102 and image processing is also performed on the image. The background image that includes no protection target and is recorded on the fixed background image recording unit 107 is hereinafter referred to as a fixed background image. A plurality of fixed background images is desirably prepared in consideration of a time period and an environmental change. Assume that a plurality of fixed background images created in advance in consideration of a time period and an environmental change is recorded on the fixed background image recording unit 107 according to the present embodiment. The image processing apparatus 100 selects a fixed background image to be used from among the plurality of fixed background images recorded on the fixed background image recording unit 107 based on the time period, illumination environment, or the like in which a monitoring system according to the present embodiment is used. When the congestion state where the target area is crowded with human bodies is sensed by the congestion state sensing unit 105, the fixed background image recording unit 107 according to the present embodiment reads the fixed background image as an operation included in the first mode, and outputs the read fixed background image to each of the image comparison unit 108 and the image combining unit 109.

The image comparison unit 108 compares the input image from the development processing unit 102 with the basic background image from the background image updating unit 106, or the fixed background image from the fixed background image recording unit 107, thereby creating protection target information for masking the protection target in the input image. As described in detail below, the protection target information is generated as an image in which a human body, which is a subject, of a protection target in the input image is masked as a silhouette. According to the present embodiment, in the second mode when the non-congestion state where the target area is not crowded with human bodies is sensed, the image comparison unit 108 creates protection target information by comparing the basic background image from the background image updating unit 106 with the input image from the development processing unit 102. On the other hand, in the first mode when the congestion state where the target area is crowded with human bodies is sensed, the image comparison unit 108 creates protection target information by comparing the fixed background image from the fixed background image recording unit 107 with the input image from the development processing unit 102. The image comparison unit 108 generates the protection target information including information about the position and shape of the subject (human body) of the protection target on the input image, and outputs the generated protection target information to each of the image combining unit 109 and the background image updating unit 106.

The image combining unit (anonymization unit) 109 creates a privacy protection image by combining the protection target information (mask image described below) acquired from the image comparison unit 108 with the basic background image output from the background image updating unit 106. Specifically, in the second mode when the non-congestion state where the target area is not crowded with human bodies is sensed, the image combining unit 109 creates privacy protection image by combining the mask image created in the second mode with the basic background image from the background image updating unit 106. In the first mode when the congestion state where the target area is crowded with human bodies is sensed, the image combining unit 109 creates privacy protection image by combining the mask image created in the first mode with the basic background image from the background image updating unit 106. The image combining unit 109 sends the created privacy protection image to the output unit 110. Imaging processing for making an individual unidentifiable in order to protect the privacy of the individual or personal information about the individual is referred to as anonymization processing. In the present embodiment, for ease of explanation, information associated with a two-dimensional array in which a pixel value corresponding to a human body area is represented by "1", which indicates a specific color, and a pixel value corresponding to an area other than the human body area is represented by "0" is used as a mask image, and the portion represented by "1" in the mask image is combined with the background image, thereby achieving the anonymization processing. As the anonymization processing, there are various methods such as a method of simply displaying only the human body area in the background image as a hollow area, a method of binarizing the human body area, and a method of performing blurring processing on the human body area.

The output unit 110 displays the privacy protection image created by the image combining unit 109 on a display screen. While FIG. 1 illustrates an example in which the output unit 110 functions as a display device, the display device may be an external display device. The destination of the output from the output unit 110 is not limited to the display device, but instead may be, for example, a network, a storage device, or other devices.

Figure 2:
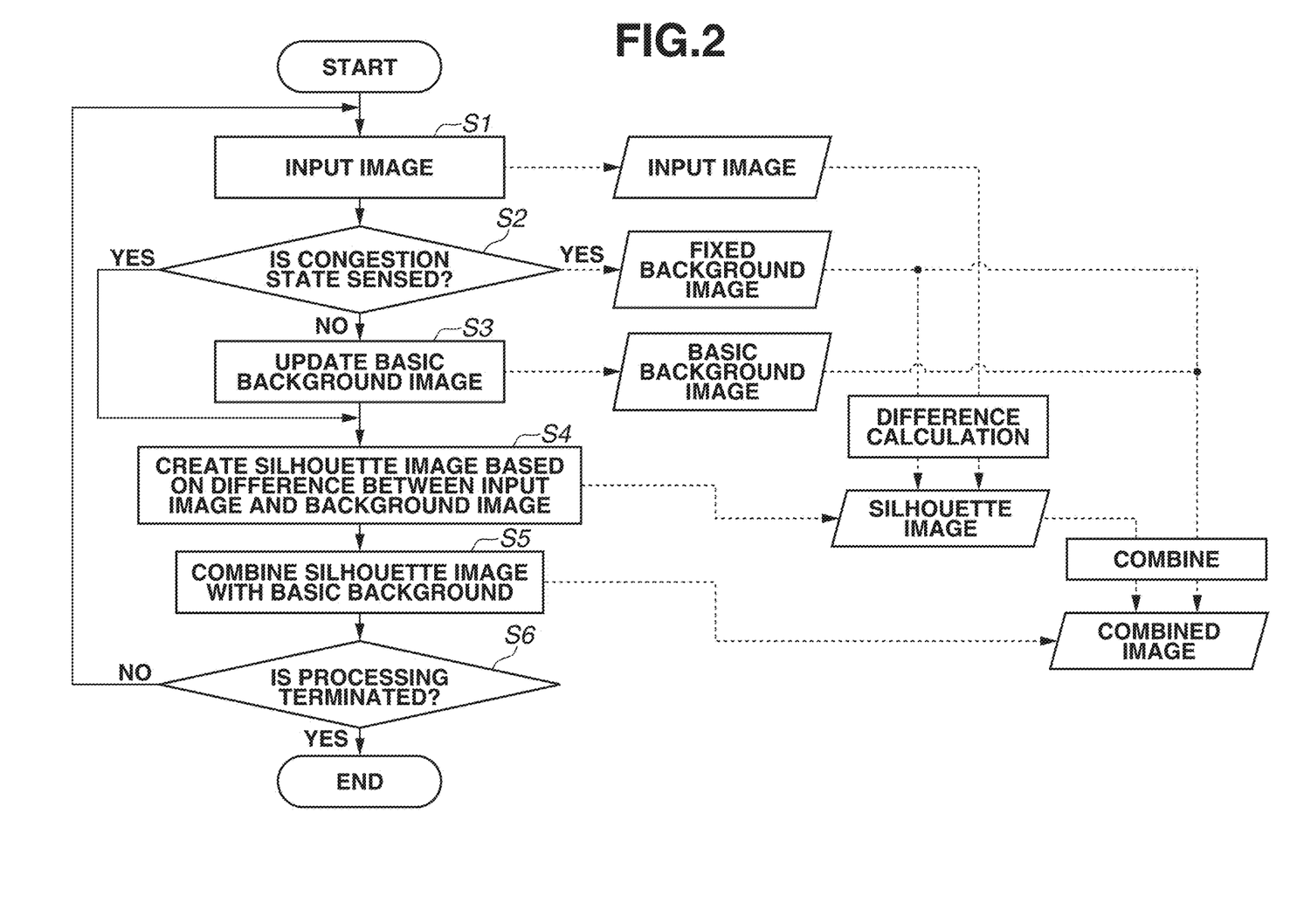
FIG. 2 is a flowchart illustrating an operation of the image processing apparatus.

FIG. 2 is a flowchart illustrating an operation of the image processing apparatus 100 according to the present embodiment. The processing of the flowchart illustrated in FIG. 2 may be executed not only by a hardware configuration, but also by a software configuration, or a combination of a software configuration and a hardware configuration. When the processing of the flowchart illustrated in FIG. 2 is executed by a software configuration, the processing is implemented in such a manner that, for example, a central processing unit (CPU) executes a program stored in a non-volatile memory. Instead of preparing the program associated with the software configuration by storing the program in the non-volatile memory in advance, for example, the program may be read from a detachable semiconductor memory, or may be downloaded via a network such as the Internet (not illustrated).

Assume that, in the image processing apparatus 100 according to the present embodiment, before starting the processing of the flowchart illustrated in FIG. 2, images used as fixed background images are preliminarily recorded on the fixed background image recording unit 107. Also assume that which one of the fixed background images recorded on the fixed background image recording unit 107 is used by the image processing apparatus 100 is determined depending on the time period, illumination environment, or the like in which the monitoring system is used.

The processing of the flowchart illustrated in FIG. 2 is started and, in step S1, the image processing apparatus 100 inputs the image data on which development is performed by the development processing unit 102 and image processing is also performed to each of the moving object detection unit 103 and the human body detection unit 104. After step S1, the processing of the image processing apparatus 100 proceeds to step S2.

In step S2, as described above, the moving object detection unit 103 of the image processing apparatus 100 performs processing for detecting a moving object from the input image, and the human body detection unit 104 performs processing for detecting a human body from the input image. Further, the congestion state sensing unit 105 senses the congestion state of human bodies in the monitoring target area based on the moving object information obtained by the moving object detection processing and the human body information obtained by the human body detection processing.

Figure 3A:
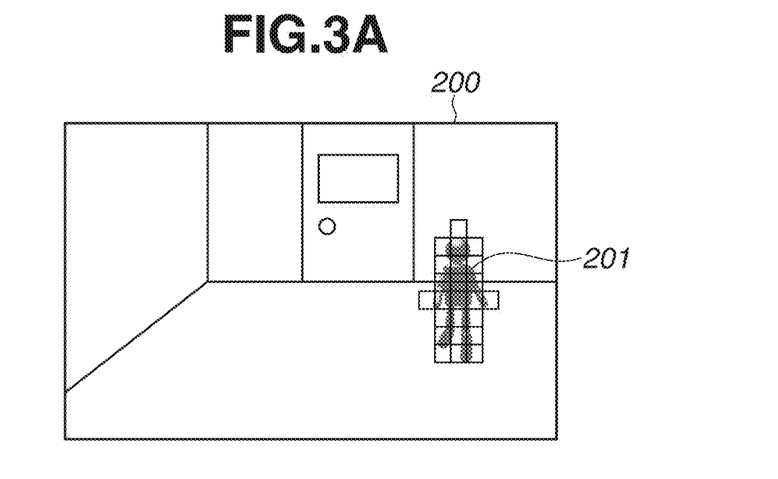
FIGS. 3A and 3B are schematic diagrams each illustrating congestion state sensing processing based on moving object information.
Figure 3B:
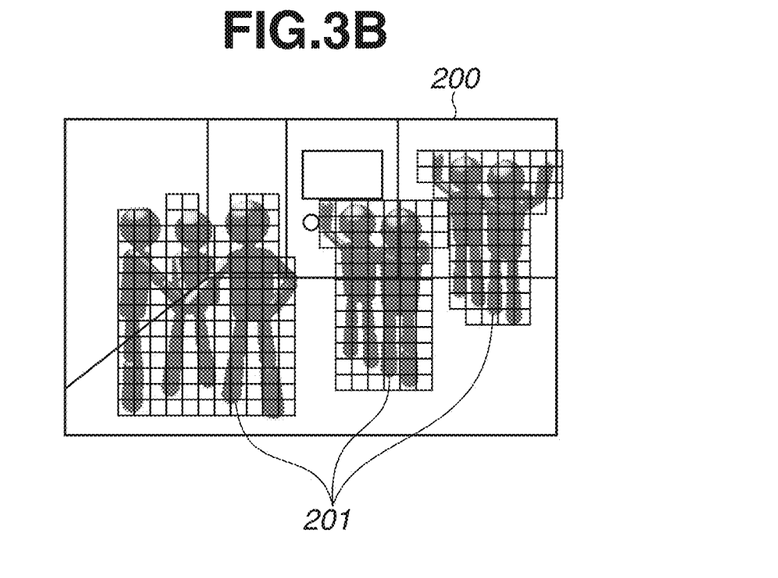

FIG. 3A illustrates an example of an image 200 in which the non-congestion state where a small number of human bodies 201, which are moving objects, exist is sensed based on the moving object information. FIG. 3B illustrates an example of the image 200 in which the congestion state where a large number of human bodies 201, which are moving objects, exist is sensed based on the moving object information. The congestion state sensing unit 105 determines that a case where a range occupied by the human bodies 201 detected as moving objects within an imaging range corresponding to the imaging angle of view of the camera is less than a predetermined range corresponds to the non-congestion state, like in the image 200 illustrated in FIG. 3A. On the other hand, the congestion state sensing unit 105 determines that a case where the range occupied by the human bodies 201 detected as moving objects within the imaging range corresponding to the imaging angle of view of the camera is equal to or more than the predetermined range corresponds to the congestion state, like in the image 200 illustrated in FIG. 3B.

Figure 4A:
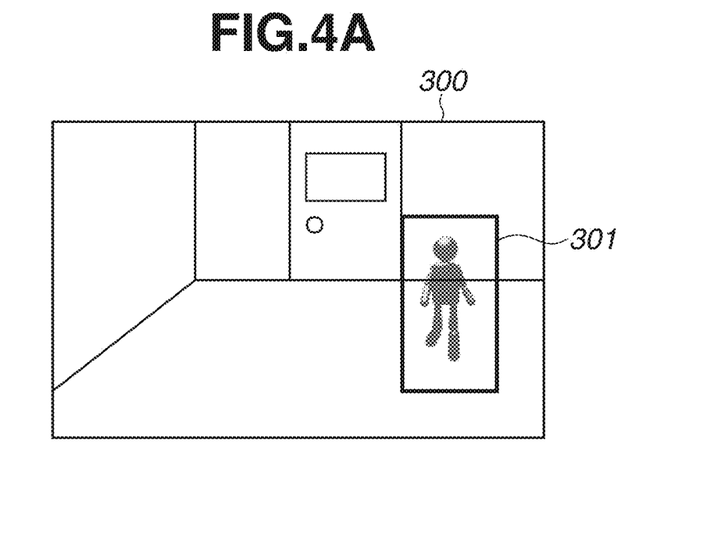
FIGS. 4A and 4B are schematic diagrams each illustrating congestion state sensing processing based on human body information.
Figure 4B:
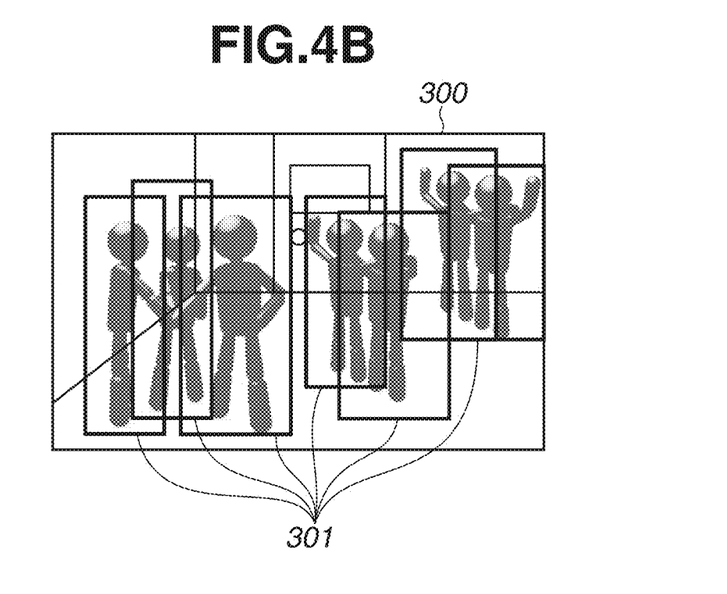

FIG. 4A illustrates an example of an image 300 in which the non-congestion state where a small number of human bodies 301, which are subjects, exist is sensed based on the human body information. FIG. 4B illustrates an example of the image 300 in which the congestion state where a large number of human bodies 301, which are subjects, exist is sensed based on the human body information. The congestion state sensing unit 105 determines that a case where the number of human bodies 301 detected within the imaging range of the camera is smaller than a predetermined number corresponds to the non-congestion state, like in the image 300 illustrated in FIG. 4A. On the other hand, the congestion state sensing unit 105 determines that a case where the number of human bodies 301 detected within the imaging range of the camera is equal to or greater than the predetermined number corresponds to the congestion state, like in the image 300 illustrated in FIG. 4B.

When the congestion state is sensed in the congestion state sensing processing by the congestion state sensing unit 105, the image processing apparatus 100 sends the fixed background image recorded on the fixed background image recording unit 107 to each of the image comparison unit 108 and the image combining unit 109. Specifically, when the congestion state is sensed by the congestion state sensing unit 105, the image processing apparatus 100 controls each of the image comparison unit 108 and the image combining unit 109 to use the fixed background image recorded on the fixed background image recording unit 107 as the background image including no protection target. After that, the processing proceeds to step S4 illustrated in FIG. 2.

On the other hand, when the non-congestion state is sensed in the congestion state sensing processing by the congestion state sensing unit 105, the processing proceeds to step S3.

In step S3, the image processing apparatus 100 causes the background image updating unit 106 to perform update processing on the basic background image. Further, the image processing apparatus 100 sends the basic background image updated by the background image updating unit 106 to each of the image comparison unit 108 and the image combining unit 109. Specifically, when the non-congestion state is sensed by the congestion state sensing unit 105, the image processing apparatus 100 controls each of the image comparison unit 108 and the image combining unit 109 to use the basic background image updated by the background image updating unit 106 as the background image including no protection target.

Figure 5:
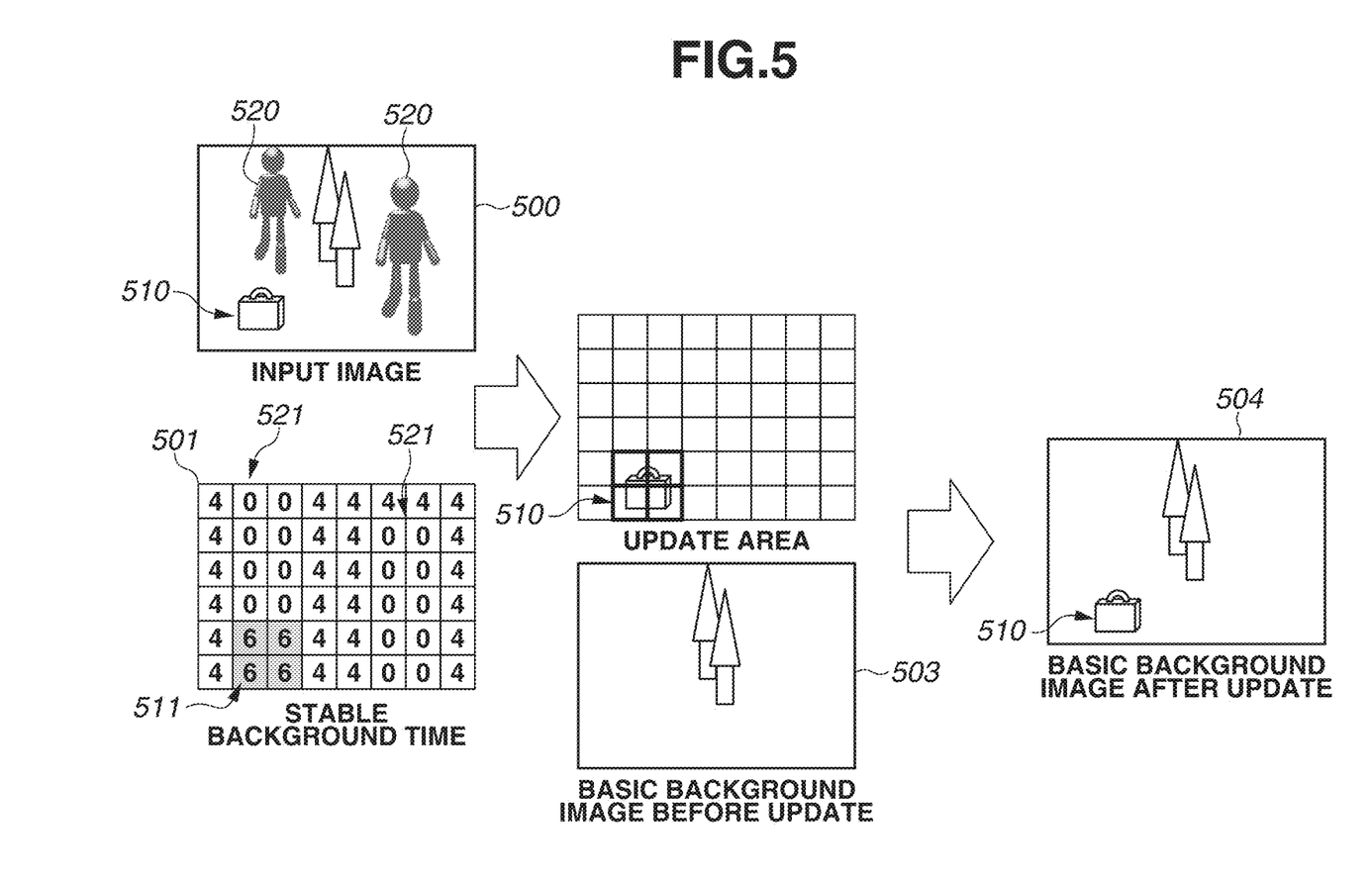
FIG. 5 is a schematic diagram illustrating background image update processing.

FIG. 5 is a diagram illustrating the operation of basic background image update processing performed by the background image updating unit 106 in step S3 illustrated in FIG. 2. Assume in FIG. 5 that, for example, human bodies 520 and a bag 510 are included in an input image 500 to be input to the background image updating unit 106. A stable background time 501 illustrated in FIG. 5 represents the length of time during which the subject and the like within the input image 500 are stationary. As illustrated in FIG. 5, in the stable background time 501, the length of time during which the subject and the like are stationary is represented as a value for each of a plurality of blocks obtained by dividing the input image 500. Specifically, the value in each block of the stable background time 501 indicates that the length of time during which the subject and the like are stationary increases as the value increases. The background image updating unit 106 according to the present embodiment calculates the length of time during which the subject and the like are stationary for each of the above-described blocks based on the moving object information obtained from the moving object detection unit 103. In the case of the example illustrated in FIG. 5, the image processing apparatus 100 manages the length of each time in the stable background time 501 in units of blocks. However, the units for management is not limited to blocks. The length of each time may be managed in units of pixels or any shape.

In the present embodiment, the image area used for updating the basic background image in the input image 500 is a stable image area in which the subject and the like are stationary and do not change for a predetermined time or longer, and the image area is an image area excluding the human body area. In the example of FIG. 5, a threshold for the predetermined time used for determining whether the image area is a stable image area in which the subject and the like are stationary is equal to or more than a time represented by, for example, a value "6". In the present embodiment, the background image updating unit 106 sets a value "0 (zero)" representing the time in which the subject and the like are stationary for each block 521 corresponding to the human bodies 520 detected by the human body detection unit 104 in the blocks of the stable background time 501. Accordingly, the background image updating unit 106 extracts, from the input image 500, the image area (image area of the bag 501) corresponding to each block 511 in which the value of the stable background time 501 is equal to or greater than "6", as an update area. Further, the background image updating unit 106 combines the update area (image area of the bag 510) with a basic background image 503, which is obtained before update, by weighted average or replacement, thereby generating an updated basic background image 504. The updated basic background image 504 is an image obtained by combining the image area (i.e., the bag 510), which is obtained by excluding the human bodies 520 in the input image 500 and which corresponds to each block 511 in which the length of time during which the subject and the like are stationary is equal to or more than the value "6", with the basic background image 503 obtained before update. In the present embodiment, the background image updating unit 106 does not extract the image area of the human bodies 520 as the update area. Accordingly, for example, even in a case where the human bodies 520 are stationary for the predetermined time or longer, the human body area is not combined and thus the human bodies 520 are prevented from being considered as the background.

The description of the flowchart of FIG. 2 will be continued.

After the update processing is performed on the basic background image in step S3 described above, or when the congestion state is sensed in step S2 described above, the processing proceeds to step S4 that is carried out by the image comparison unit 108.

In step S4, the image comparison unit 108 creates a silhouette image based on the difference between the input image and the fixed background images which are switched according to the congestion state and used as described above, or the updated basic background image. The silhouette image is generated by masking a protection target subject, i.e., a human body, in the input image as a silhouette. Specifically, in the present embodiment, in the first mode in which the congestion state is detected, the silhouette image is generated by combining the fixed background image with the mask image, and in the second mode in which the non-congestion state is detected, the silhouette image is generated by combining the basic background image with the mask image. Next, the processing proceeds to step S5 that is carried out by the image combining unit 109.

In step S5, the image combining unit 109 combines the above-described basic background image with the silhouette image, thereby creating the privacy protection image. The privacy protection image is an image in which a privacy protection target subject (human body) in the input image is masked as a silhouette to protect the privacy of the human figure (human body). In other words, according to the present embodiment, the privacy protection image is created by switching, according to the congestion state, the first mode in which the fixed background image is combined with the mask image and the second mode in which the basic background image is combined with the mask image.

After that, in step S6, the image processing apparatus 100 determines whether to terminate the processing in response to an end instruction from a system administrator or the like, or continue the processing. If the processing is continued (No in step S6), the processing returns to step S1. If the processing is terminated (Yes in step S6), the processing of the flowchart illustrated in FIG. 2 is terminated.

As described above, in the image processing apparatus 100 according to the present embodiment, the fixed background image recording unit 107 holds the fixed background image including no protection target subject, and the background image updating unit 106 updates the basic background image in the non-congestion state. Further, the image processing apparatus 100 according to the present embodiment combines the privacy protection image by switching, according to the congestion state of human bodies within the imaging range, the first mode in which the mask image is combined with the fixed background image and the second mode in which the mask image is combined with the basic background image. That is, according to the image processing apparatus 100 according to the present embodiment, the mask image generated using the background image depending on an imaging environment (a degree of congestion of human bodies as privacy protection targets) is used, thereby achieving a higher privacy protection performance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2017-131003, filed Jul. 4, 2017, which is hereby incorporated by reference herein in its entirety.

What is claimed is:

1. An image processing apparatus comprising a computer executing instructions that, when executed by the computer, cause the computer to function as:
    an acquiring unit configured to acquire a captured image;
    a holding unit configured to hold a first background image, the first background image being a predetermined image which does not include an anonymization target;
    an updating unit configured to generate a second background image updated based on the captured image acquired by the acquiring unit; and
    a generation unit configured to:
    perform a first generation process for generating an output image by combining the first background image with an anonymizing image for anonymizing the anonymization target in the captured image; and
    perform a second generation process for generating an output image by combining the second background image with the anonymizing image for anonymizing the anonymization target in the captured image,
    wherein the generation unit is configured to perform the first generation process if a congestion state of anonymization targets is detected, and to perform the second generation process if a non-congestion state of anonymization targets is detected.

2. The image processing apparatus according to claim 1, further comprising a detection unit configured to detect a person in the captured image,
    wherein the updating unit is configured to generate the second background image updated based on the captured image and a detection result of detection by the detection unit.

3. The image processing apparatus according to claim 1, wherein the generation unit is configured to:
    generate the anonymization image by anonymizing a foreground region, corresponding to the anonymization target, identified through comparing the captured image with the first background image, if the first generation process is perform; and generate the anonymization image by anonymizing a foreground region, corresponding to the anonymization target, identified through comparing the captured image with the second background image, if the second generation process is performed.

4. The image processing apparatus according to claim 1, further comprising a detecting unit configured to detect the state of the congestion of the anonymization targets included in the captured image.

5. The image processing apparatus according to claim 4, wherein the detecting unit is configured to:

detect that the state of the congestion is a congestion state, if a size of a foreground object identified by using a background difference method in the captured image is equal or greater than a predetermined value; and detect that the state of the congestion state is a non-congestion state, if the size of the foreground object in the captured image is less than the predetermined value.

6. The image processing apparatus according to claim 4, wherein the detecting unit is configured to:

detect that the state of the congestion is a congestion state, if a number of the anonymization targets detected from the captured image is equal to or greater than a predetermined value; and detect that the state of the congestion is a non-congestion state, if the number of the anonymization targets is less than the predetermined value.

7. The image processing apparatus according to claim 1, wherein the anonymization target is a person.

8. The image processing apparatus according to claim 1, wherein the first background image is the captured image which does not include the anonymization target.

9. The image processing apparatus according to claim 1, wherein the anonymizing image is a mask image for masking a region corresponding to the anonymization target.

10. An image processing method comprising:

acquiring a captured image from an image capturing device;

holding a first background image, the first background image being a predetermined image which does not include an anonymization target;

performing update processing to generate a second background image updated based on the captured image acquired in the acquiring; and selecting one of a first generation process and a second generation process based on a state of a congestion of anonymization targets in the captured image; and performing selected one of the first generation process and the second generation process, wherein the first generation process is performed if a congestion state of anonymization targets is detected, and wherein the second generation process is performed if a non-congestion state of anonymization targets is detected.

11. The image processing method according to claim 10, wherein the anonymization target is a person.

12. The image processing method according to claim 10, wherein the first background image is the captured image which does not include the anonymization target.

13. The image processing method according to claim 10, wherein the anonymizing image is a mask image for masking a region corresponding to the anonymization target.

14. A non-transitory computer-readable storage medium storing a computer program for causing a computer to execute an image processing method, the processing method comprising:

acquiring a captured image from an image capturing device;

holding a first background image, the first background image being a predetermined image which does not include an anonymization target;

performing update processing to generate a second background image updated based on the captured image acquired in the acquiring; and selecting one of a first generation process and a second generation process based on a state of a congestion of anonymization targets in the captured image; and performing selected one of the first generation process and the second generation process, wherein the first generation process is performed if a congestion state of anonymization targets is detected, and wherein the second generation process is performed if a non-congestion state of anonymization targets is detected.

15. The non-transitory computer-readable storage medium according to claim 14, wherein the anonymization target is a person.

16. The non-transitory computer-readable storage medium according to claim 14, wherein the first background image is the captured image which does not include the anonymization target.

17. The non-transitory computer-readable storage medium according to claim 14, wherein the anonymizing image is a mask image for masking a region corresponding to the anonymization target.

* * * * *